United States Patent
Balakrishnan et al.

(10) Patent No.: US 7,289,121 B1
(45) Date of Patent: Oct. 30, 2007

(54) SYSTEM FOR CREATING AND MODIFYING CURVES AND SURFACES

(75) Inventors: Ravin Balakrishnan, Toronto (CA); George William Fitzmaurice, Toronto (CA); Gordon Paul Kurtenbach, Toronto (CA); Karan Singh, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/539,872

(22) Filed: Mar. 31, 2000

(51) Int. Cl.
G06T 11/20 (2006.01)

(52) U.S. Cl. ............... 345/441; 345/419; 345/420; 345/441; 345/442

(58) Field of Classification Search ............... 345/771, 345/756, 757, 441, 442, 419, 420, 422, 409
See application file for complete search history.

(56) References Cited

U.S. PATENT DOCUMENTS

| 5,811,051 A | * | 9/1998 | Kikuchi et al. ............ 264/409 |
| 6,127,672 A | * | 10/2000 | Danisch ................. 250/227.14 |
| 6,256,039 B1 | * | 7/2001 | Krishnamurthy ............ 345/420 |

OTHER PUBLICATIONS

Balakrishnam et al. (1999), Exploring Interactive Curve and Surface Manipulation Using a Bend and Twist Sensitive Input Strip. Proceedings of 1999 ACM SYmposium on Interactive 3D graphics pp. 111-118.*
Ma, Lau, Feng, Peng, Wong; Surface Deformation Using the Sensor Glove; ACM 1997, pp. 189-196.*
Balakrishnam et al. (1999) Exploring Interactive Curve and Surface Manipulation Using a Bend and Twist Sensitive Input Strip. Proceedings of 1999 ACM Symposium on Interactive 3D Graphics pp. 111-118.
CyberGlove. Virtual Technologies (www.virtex.com).
Monkey. Digital Image Design, Inc. (www.didi.com).
ShapeTape. Measurand Inc. (www.measurand.com).
B.D. Conner et al., (1992) Three-dimensional widgets. Proceedings of Symposium o nInteractive 3D graphics '92, 183-188.
G.W. Fitzmaurice et al., (1995) Bricks: Laying the foundations for graspable user interfaces. Proceedings of CHI'95 Confrence on Human Factors in Computing Systems, 442-449.
H. Ishii et al., (1997) Tangible Bits: Towards seamless interfaces between people, bits and atoms. Proceedings of CHI'95 Conference on Human Factors in Computing Systems, 234-241.

(Continued)

*Primary Examiner*—Kimbinh T. Nguyen
(74) *Attorney, Agent, or Firm*—Staas & Halsey LLP

(57) ABSTRACT

A system that has a flexible tape input device with bend and twist sensors spaced along the tape and a curve generation system producing a virtual B-spline tape curve using the bend and twist information. A shape of the tape can be physically constrained to assist a user in obtaining and holding a desired shape. A world position sensor senses the real world position and orientation for the tape in world space and the virtual curve is placed in a scene responsive to the position and orientation. The curve at a desired location can be input into a virtual scene. The virtual curve can be used to create, control and edit 3D curves, surfaces and objects in real time. The tape can also act as a shape scanning device as well as a command input device.

42 Claims, 20 Drawing Sheets

OTHER PUBLICATIONS

K. Hinckley et al., (1994) Passive real-world interface props for neurosurgical visualization. Proceedings of CHI'94 Conference on Human Factors in Computing Systems, 452-458.

E. Sachs et al., (1990) A tool for designing 3D shapes. IEEE Computer Graphics, 17(3), 253-261.

C. Shaw et al., (1994) Two-handed polygonal surface design. Proceedings of UIST'94 ACM Symposium on User Interface Software and Technology, 205-212.

K. Singh et al. (1998) Wires: A geometric deformation technique. Proceedings of SIGGRAPH'98 Conference, 405-414.

R.C. Zeleznik et al., (1996) SKETCH: An interface for sketching 3D scenes. Proceedings of SIGGRAPH '96 Conference, 163-170.

* cited by examiner

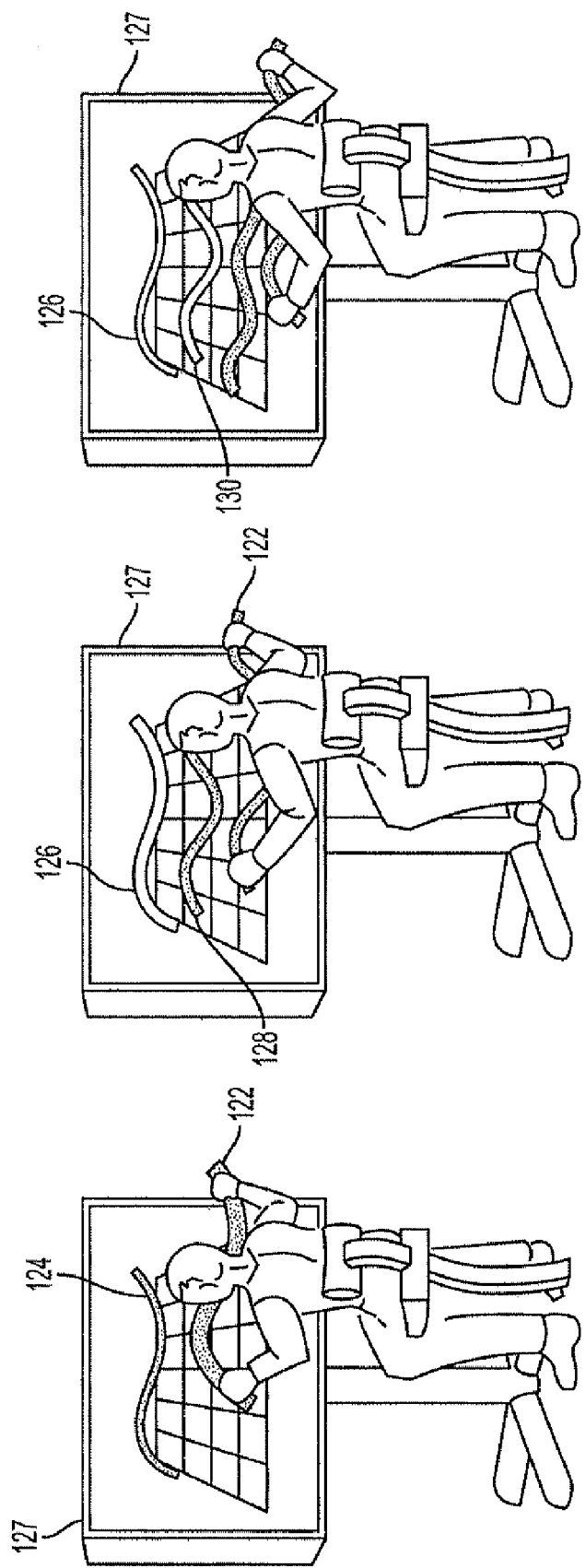

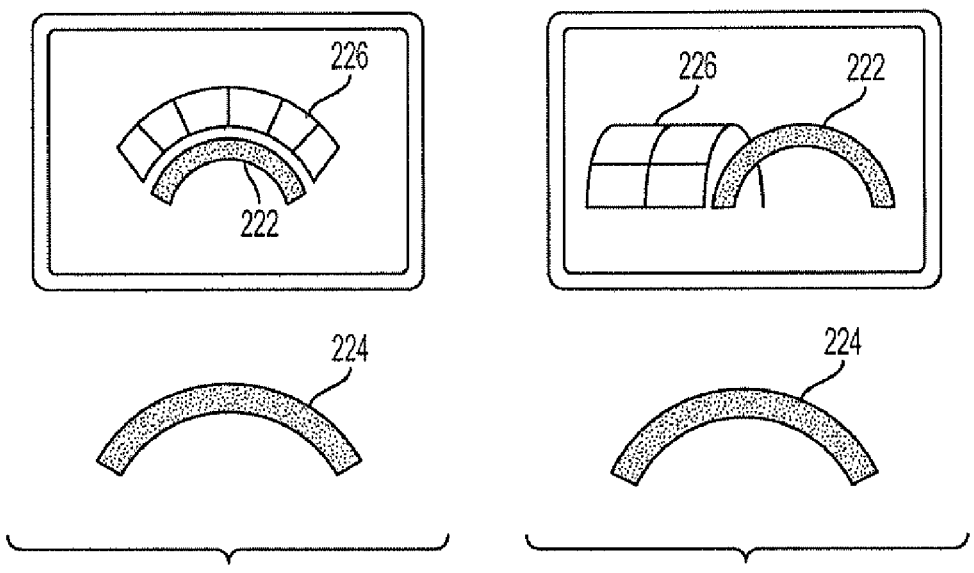

SYSTEM FOR CREATING AND MODIFYING CURVES AND SURFACES

BACKGROUND OF THE INVENTION

1. Field of the Invention

The present invention is directed to a curve input system that inputs curves using a physical flexible tape and, more particularly, to a system that inputs and manipulates a multiple degree of freedom virtual curve responsive to the multiple degrees of freedom of the flexible tape.

2. Description of the Related Art

In 3D (three-dimensional) computer graphics modeling, curves are the quintessential primitive for constructing and manipulating surfaces. Successful 3D modeling is largely based on producing the right set of curves which ultimately give rise to the desired 3D shape. Thus, techniques for developing and controlling curve shapes are an important issue.

Most current interactive curve manipulation techniques require that the user, to some extent, work with the mathematical definition of a curve to control its shape. For example, curves are created and controlled by virtual techniques, such as by controlling vertex positioning and adjusting curve continuity and tangency.

In the design industry, traditional physical techniques such as clay modeling and paper drawings are still very popular. In these techniques, the clay or paper curve itself is manipulated directly by copying preshaped physical curves (e.g., french curve templates) or using physical tools which flex to produce curves (e.g., flexible steels).

Because virtual manipulation and physical manipulation of curves are so different, a designer's physical modeling skills do not wholly transfer to virtual modeling. For example, a designer can express a particular shape using a flexible french curve by simply bending the french curve. However, with a virtual curve it may not be clear how the control vertices need to be placed to attain this shape.

Certain physical objects can also quickly produce curves and surfaces that are hard to create using virtual techniques. For example, the affordances of spring steels are exploited by clay autobody sculptors who use large spring steel rulers, flexed into shape using both hands, to smoothly sweep out a curved surface on clay.

Obviously, both virtual and physical curve modeling have their own pros and cons. What is needed is a system that combines virtual and physical curve creation and control techniques.

SUMMARY OF THE INVENTION

It is an object of the present invention to input, control and edit multi-dimensional curves using a flexible input device.

It is another object of the present invention to control surfaces and objects with the flexible input device.

It is a further object of the present invention to provide a flexible input device that can input commands.

It is an additional object of the present invention to provide a flexible input device that can be used to control curves in animated scenes.

The above objects can be attained by a system that has a flexible tape input device with bend and twist sensing devices spaced along the tape and a curve generation system producing a virtual B-spline tape curve using the bend and twist information. A position sensor senses the position and orientation for the tape in world space and the virtual curve is placed in a scene responsive to the position and orientation. The virtual curve can be used to create, control and edit 3D curves, surfaces and objects. The tape can also act as an input command device.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 11A-11C show curve dropping in a scene.

FIGS. 18A and 18B show controlling a shape of a surface with a curve always oriented to the user.

DESCRIPTION OF THE PREFERRED EMBODIMENTS

Figure 1:
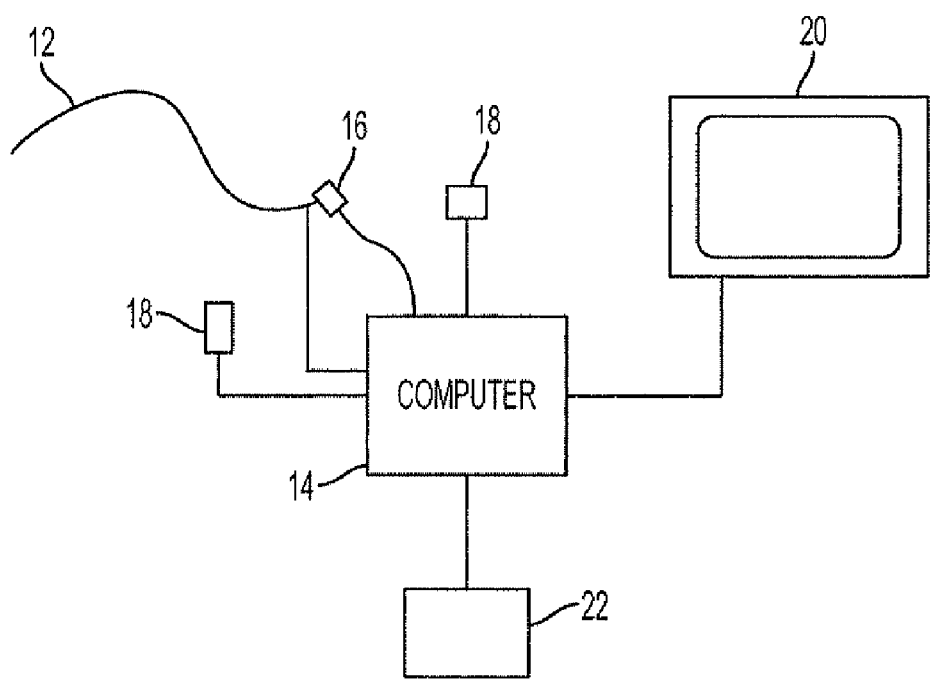
FIG. 1 depicts an embodiment of the present invention.

The present invention is directed to the use of a specialized flexible tape like input device (flexible tape input device) 12 as shown in FIG. 1 and a set of interaction techniques to facilitate direct manipulation of curves and surfaces. The flexible tape input device or flexible tape 12, called ShapeTape™ and available from Measurand, Inc. of Fredericton, New Brunswick, Canada, is a continuous bend and twist sensitive strip that encourages manipulations that use both hands and, at times, all ten fingers. The present describes this input and interaction design space through a set of usage scenarios for creating and editing curves and surfaces as well as general interactions such as command access and camera controls. Output position values of produced by the flexible tape 12 are supplied as B-spline curve control vertex inputs to the Maya™ modeling and animation package available from Alias |Wavefront a Canadian subsidiary of Silicon Graphics, Inc. and running on a workstation class computer 14, such as the Silicon Graphics Indigo2™ workstation. The bend and twist input values from the tape 10 are used to control the control polygon of a curve primitive for one or more conventional spline curves.

A world position and orientation of the flexible tape is determined using a conventional electromagnetic six-degree-of-freedom tracking system that includes a tracker 16 (or locator or world position sensor) with up to six finger operated control buttons (not shown) and a pair of field generators 18. Such a tracking system called an Ascension Flock of Birds is available from Ascension Technology Corporation of Burlington, Vt.

A curve having a shape as determined by the vertex control points is displayed on a display 20, and the three-dimensional position and three-dimensional orientation of the curve in the virtual space shown on the display is controlled by the position of the tracker 16. Additional input control devices 22, in addition to the tape, the tracker and the bottons on the tracker, can be provided such as a foot controlled rocker pedal, a foot controlled momentary pedal, a foot mouse, etc. The computer system also includes storage, such as magnetic and optical discs, RAM, ROM, etc. on which the process of the present invention can be stored and distributed.

Figure 2:
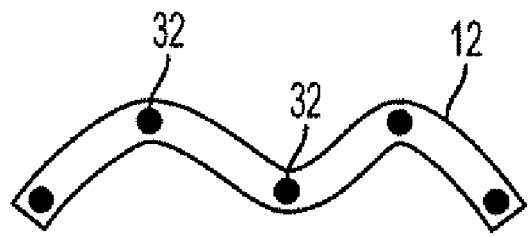
FIG. 2 illustrates a flexible tape.

The processes can also be distributed via, for example downloading, over a network such as the Internet The flexible tape input device 12 (FIG. 2) is a 48×1×0.1 cm rubber tape that senses its bend and twist. Bend and twist are measured at 6 cm intervals by fiber optic bend sensors 32. Resolution is limited by the spacing of these sensors 32. By summing the bends and twists of the sensors along the tape, the segmental shape of the tape relative to the first sensor can be reconstructed. The present invention sample all 16 sensors along the tape at a sampling frequency of 30 Hz.

Figure 3:
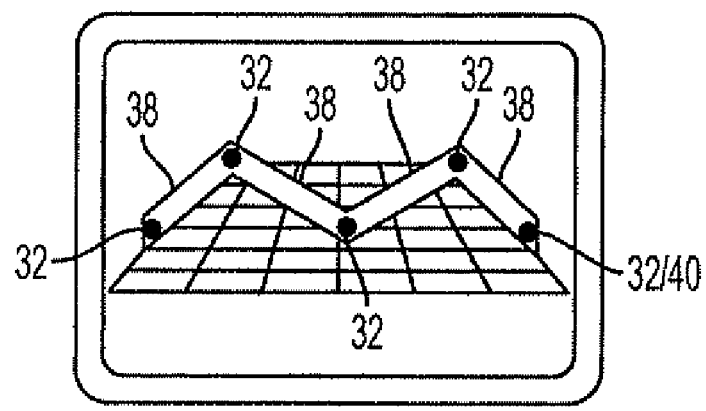
FIG. 3 illustrates a segmented line created from the bend points of the tape of FIG. 2.

Conventionally the positions of the sensors 32 along the tape 12 are used as or mapped to the endpoints of a set of straight line segments 38 allowing the tape to be used to inputs segmented straight lines, as depicted in FIG. 3, where the end of the segmented straight line starts from a predetermined reference point 40 within the display. When used as straight line endpoint values there is a proportional correspondence between the change in position of an sensor position and the position of a segment endpoint and other points associated with the end point. The sequence of straight line segments 38 conventionally produced by mapping the sensor positions to the endpoints of the line segments produces a piecewise linear curve which is not smooth. That is, a piecewise linear curve has a first derivative that is not continuous or, from another point of view, the slopes of the piecewise linear curve on each side of a segment endpoint do not match.

Figure 4:
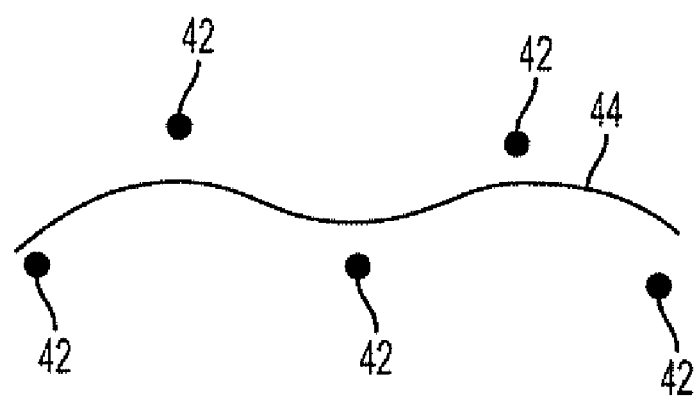
FIG. 4 illustrates a NURBS curve created using bend points as control points.

As shown in FIG. 4, the present invention does not use the positions of the tape indicated by the sensors as straight line end points but rather uses the positions as the values of vertex control points 42 of a conventional spline curve 44, such as $$P(u) = \sum_{i=0}^{n} p_i N_{i,k}(u)$$

where p is a control point, N is a desired blending function, k is a continuity control parameter and n is the number of control points of the curve. As a result, the invention produces a true continuous, smooth curve rather than a segmented straight line. As the positions of the control points 42 change the shape of the curve 44 changes. The curve produced by the present invention, where the positions become control points of a spline curve, is a smooth curve such that the first derivative is continuous and the slopes on each side of a control point match. Other types of smooth curves could be used instead of the B-spline curve preferred, such as a cubic spline, an interpolated polynomial and a curve that is fit to the points using a fitting technique such as least squares fitting. Additionally, depending on the particular type curve being used, the control points chosen and the position along the curve, the movement of a control point from one position to another does not necessarily result in a proportional movement of the corresponding curve position.

More particularly and preferentially, the positions for the sensors output by the flexible tape input device 12 are used to control NURBS (Non-Uniform Rational B-Spline) curves within Maya™. A one to one mapping is preferably used between the tape outputs and a NURBS curve, such that changing the shape of the tape 12 results in a corresponding change to the NURBS curve. The end of the tape 12 located at the tracker or locator 16 is mapped to the virtual location (or scene location) of the locator 16 and the remaining positions of the tape are translated accordingly.

Figure 5:
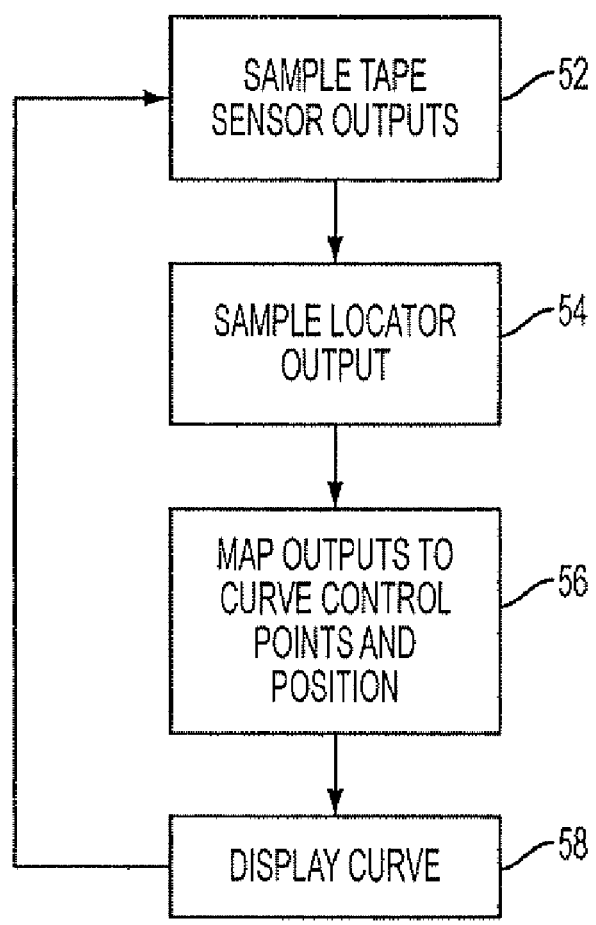
FIG. 5 shows a flow of operations in the present invention.

The displayed tape curve is provided by sampling 52 the tape outputs providing the sensor positions of the tape 12 and sampling 54 the position and orientation of the locator 16 as depicted in FIG. 5. The system then maps 56 the shape segments along the tape 12 to a subset of the control polygon (control vertices) of a NURBS curve along with mapping the curve position to a location specified by the locator 16.

Because the position of the tape as specified by the locator 16 can include rotation, rotation samples from the locator simply map to the control vertex sequence such that: $P_{i+1}=P_i+L*R_i$, where $P_i$ is the position vector of the ith control point, $R_i$ the ith rotation matrix and L a vector representing segment length between samples. $P_0$, $R_0$ is given by the position and orientation of the first sensor on the tape in 3D space as will be described in more detail later herein. For most applications it is preferred that the mapped curve to be planar. $R_i$ is constructed from the bend samples in this case and is simply the rotation matrix for the sum of all bends from 0 . . . i. Incorporating the twist samples into the calculation of $R_i$ is a conventional operation. Once the mapping is complete the virtual curve or tape curve is displayed 58. The system then loops back for another set of samples 52.

To create and manipulate curves in a 3D scene more is needed than the ability to simply input the shape of a curve. The system of the present invention is designed to support operations like command execution, camera controls, and positioning/orienting the entire curve in 3D space. Since tape 12 requires and benefits from using both hands and all fingers to operate it, it is unwieldy to rely on the status-quo mouse/keyboard for these secondary functions since this would require that the user release their hold on the tape 12. The invention augments the tape 12 so that secondary functions can be performed while both hands manipulate the tape 12. Another approach is to design the interactions such that the tape 12 can be picked up and put down. It appears to be more important to try to accomplish everything while holding the shape tape. Alternative designs are discussed later herein.

Figure 6:
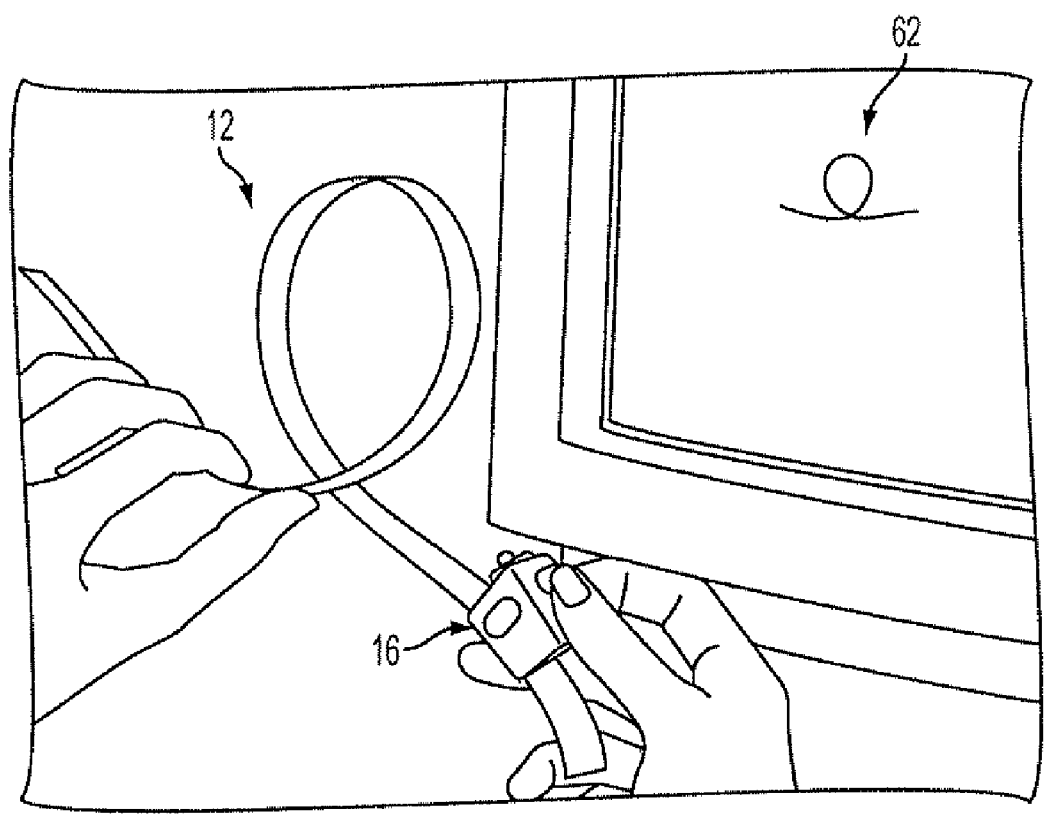
FIG. 6 illustrates a flexible tape controlling a virtual 3D tape curve.

To position and orient the curve in 3D space, as previously discussed a six degrees-of-freedom (dof) tracker 16 is attached to the starting point of the tape 12 as shown in FIG. 6. The tape 12 and the virtual curve 62 (tape curve) it controls then operate relative to this starting position as previously mentioned.

Figure 7:
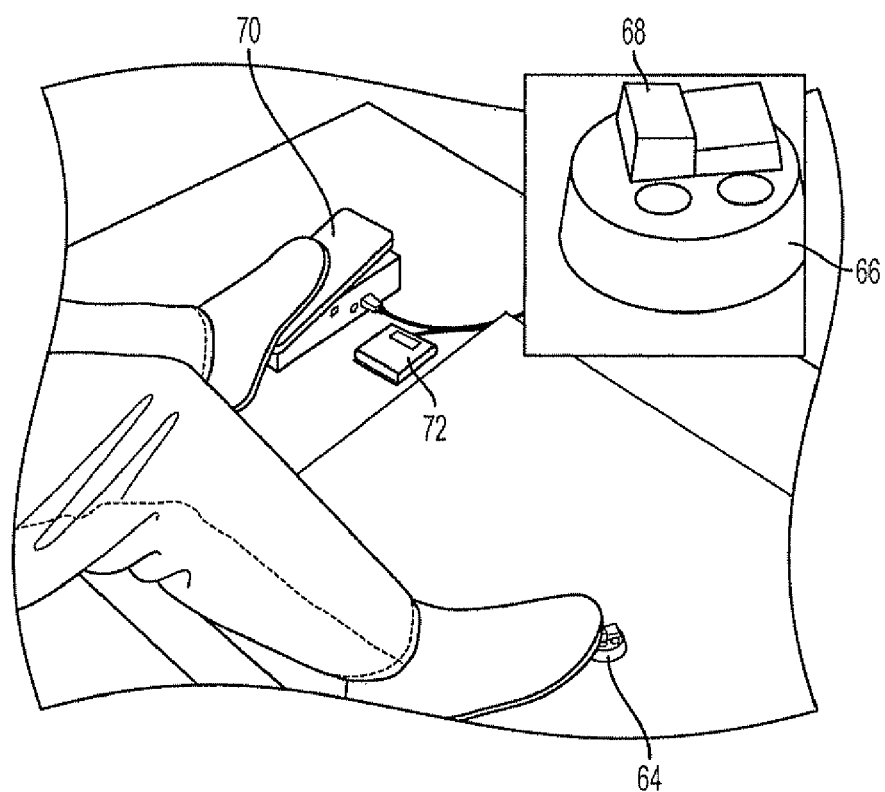
FIG. 7 depicts input control devices of the present invention.

All the interactions are preferably designed to operate in a perspective view and, therefore, users need to at least be able to tumble the virtual camera to get both depth perception and different views of the curves/surfaces on which they are working. Such camera controls can be provided by a foot mouse 64 as shown in FIG. 7. A foot mouse is a 2-dof puck 66 having stylus type position sensors incorporated therein that is operated by the user's right foot on a Wacom digitizing tablet. This foot mouse has a single button 68 on it that allows the user to switch to camera tumble mode and tumble the scene by stepping on the foot mouse and moving it around on the tablet. When the scenes are not very complicated, this tumbling control is a sufficient camera control.

As previously mentioned pushbuttons, preferably four, can be added to the 6-dof tracker 16 to provide for command execution and activation of the tracker 16. The buttons are preferably chosen and arranged on the tracker 16 such that accidental triggering is minimized and more than one button can be pressed at the same time.

Using the buttons of the tracker 16 requires one hand to be at the end of the tape 12 which reduces the user's ability to manipulate the shape of the tape 12 itself. To somewhat alleviate this problem, two foot pedals (a rocker pedal 70 and a momentary pedal 72) can be provided and operated by the left foot for additional button input while the user used both hands to shape the curve 62.

In a manner similar to most 3D modeling, various curve and surface manipulation functions can be implemented as temporal modes (commonly called "tools"). Tool switching can be accomplished using a keyboard. In each of the tools, the following foot pedal and button assignments preferably are as shown in Table 1 and Table 2 below.

TABLE 1

Functionality of devices

| Device | Limb | Function |
| --- | --- | --- |
| rocker pedal | left foot | up: position/orient tape curve mode down: command mode |
| momentary pedal | left foot | toggle between freezing and unfreezing shape of tape curve |
| footmouse | right foot | tumble camera |
| flexible tape | both hands | control shape of tape curve |
| tracker | right hand | control position and orientation of tape curve |
| tracker buttons | right hand | command access and tracker constraints (see Table 2) |

TABLE 2

Tracker button assignment

| tracker button | position/orient tape curve mode | command mode |
| --- | --- | --- |
| button 1 | constrain to x axis | next step in tool |
| button 2 | constrain to y axis | end tool |
| button 3 | constrain to z axis | |
| button 4 | rotation on/off | |

When the rocker pedal is up, the tracker 16 is operational and the tape curve 64 can be positioned and oriented in 3D space. This is "position/orient tape curve mode". In this mode, buttons 1, 2, and 3 on the tracker 16 engage and clutch movement along the x, y, and z axes respectively. This can be implemented by modifying the operations of FIG. 5 to include a limitation on the motion of the tape curve 62 in the virtual space responsive to the button thus activated. These motion limitations are activatable within conventional modeling, and animation packages such as Maya™ and a person of ordinary skill can provide the limitations by activating the conventional functions. For example, when button 1 is activated motions in the y and z axis directions as sensed by the tracking system are ignored (not mapped). With such axial limitations activated and not activated various additional actions can be allowed or suppressed. Chording buttons 1, 2, and 3 would allow movement in multiple axes simultaneously while pressing both buttons 1 and 2 engages movement in the plane defined by the x and y axes. Button 4, in conjunction with an indicator on the display 20 is used as a toggle to enable and disable all three rotational degrees-of-freedom of the tracker 16. Implementation of this function is accomplished by not mapping disabled rotational axes.

When the rocker pedal 70 is down, the tracker 16 is disengaged and the tracker buttons are conventionally made available to be used to execute commands. This is the "command mode". Button 1 is preferably used to conventionally activate the next step in the tool currently being used. Button 2 conventionally signals completion of the tool's operation and resets the tool to its initial state (this allows a tool's operation to be repeated without having to reinvoke the tool). Buttons 3 and 4 are used for commands specific to particular tools, which are described later herein.

The foot mouse 64 and momentary pedal 72 are preferably independent of modes and thus can be used at any time.

At any time during the changing of the shape and position of the curve 62, the shape and position of the curve 62 can be saved much like taking a snapshot. This can be accomplished by allowing the momentary pedal to be depressed to freeze the shape of the tape curve 62. This can be implemented as an interrupt process that temporarily saves the values of the curve control points at the time the pedal is depressed and ignores further control point input from the flexible tape. Or it can be implemented within the loop back between operations 58 and 52 of FIG. 5 where the pedal is sampled, the control points saved and the system enters a wait state awaiting a command to continue sampling. Once the curve has been frozen conventional actions associated with operations with curves, such as attaching the curve to another curve or positioning and orienting the curve in 3D space while the curve shape is frozen can be performed using the conventional functions provided by Maya™. Depressing the momentary pedal a second time unfreezes the shape of the tape curve by providing the command to continue processing which allows inputs from the flexible tape to be processed. This concept of freezing/unfreezing the tape curve shape using the momentary pedal can be used throughout different interaction techniques.

When in a command mode, pressing button, such as button 1, results in a snapshot copy of the tape curve being placed in or saved at its current location and orientation. This can be referred to as "baking" the tape curve into the 3D scene. As noted previously, baking involves permanently saving the values of the control points of the tape curve at the time indicated by the user activating button 1 on the locator 16. The system can bake the tape curve either when it is live or frozen. If the tape curve is live, immediately alter the control points or saved inputs from the flexible tape or continued to be processed. This technique is intuitive to the user for creating free-form 3D curves and it allowed for quick exploration and specification of curve shapes, position, and orientation.

While the position and orientation of the tape curve can be controlled fairly precisely using the methods described above for constraining movement to particular axes, it can be difficult to precisely control the shape of the tape curve. However, the invention can be adapted to be used with physical tools sometimes used by designers where the physical tools apply physical constraints to the flexible tape to improve control over the shape of the tape curve.

Figure 8:
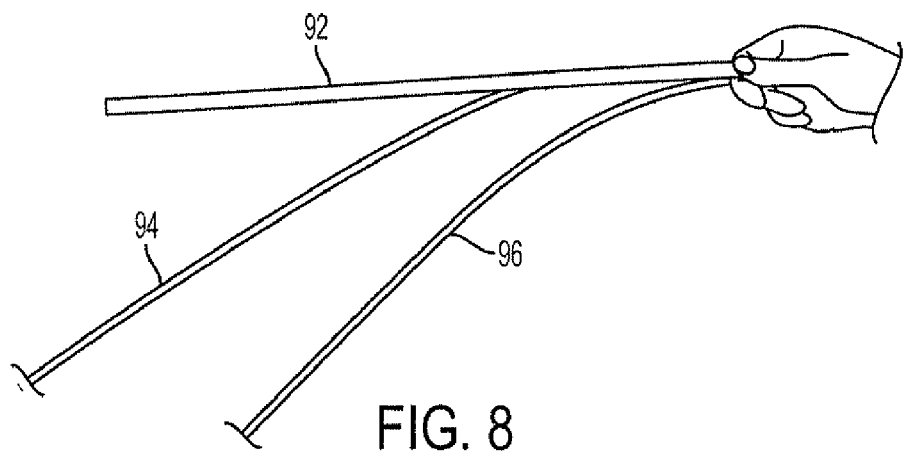
FIG. 8 depicts a flexible tape with various substitutable mechanical stiffness members.
Figure 9:
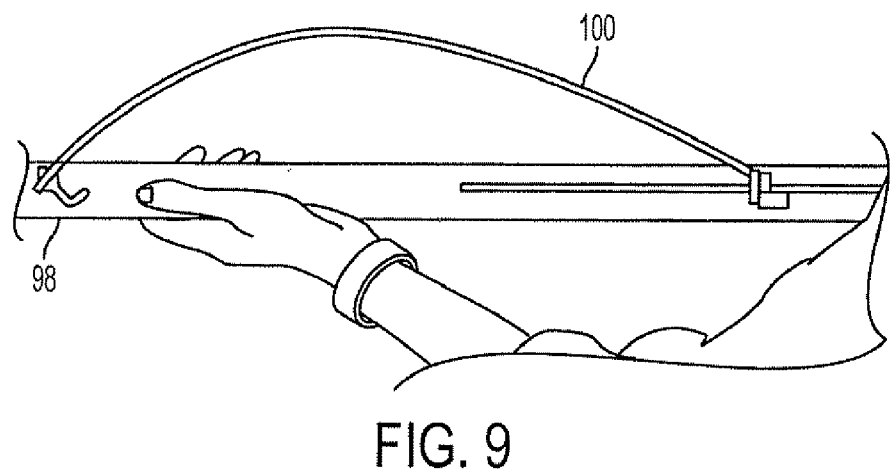
FIG. 9 depicts a tape shape lock jig.

One form of physical constraint is to attach spring steels to the flexible tape. Using steels of different thicknesses and degree of flexibility or mechanical stiffness as shown by the different flexible tapes 92, 94 and 86 in FIG. 8, the deformability of (or ability to deform the) flexible tape can be varied and which physically controls the smoothness and curvature of the tape curve. Using small strips of velcro on the tape and the substitutable steels allows the user to switch between different steels easily. One characteristic of spring steels is that they have to be continually held in the desired shape and do not retain the deformed shape when released. While this can be a desirable feature when exploring shape, it can be a shortcoming when trying to maintain a particular shape for a period of time. To address this shortcoming, a jig 98 as shown in FIG. 9 having a fixed position clamp and a movable clamp allows a user to mechanically hold the spring steel with attached flexible tape in a deformed shape locking the physical position and shape into place. Once the desired shape is obtained, wing nuts on the movable clamp of the jig 98 are tightened and the entire jig 98 (and resulting tape curve) can be positioned and oriented as required. Position and orientation of the jig 98 can also be physically constrained in a variety of ways. Examples include simply dragging the jig 98 on a tabletop to constrain movement to a plane, or mounting the jig 98 within a larger jig that imposes some other positional or rotational constraints.

Figure 10:
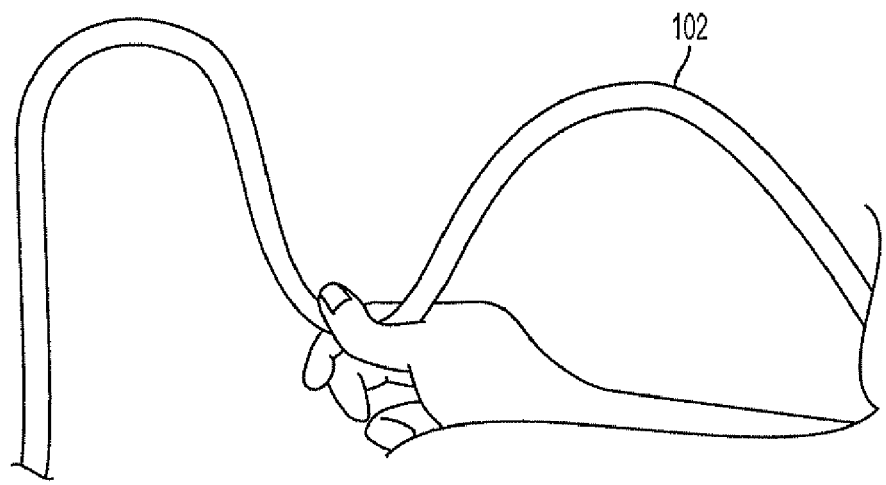
FIG. 10 shows a flexible tape that retains its shape.

Another form of physical constraint is to use conventional flexible curves 102 to which the flexible tape is attached as shown in FIG. 10. These conventional curves, used in the design industry, do not provide the high level of smoothness that spring steels offer but retain their deformed shape when released. They are a good compromise when smoothness is not an important factor.

The use of steels, jigs, and flexible curves have the advantage that the user can easily switch between these different constraints and leverage off existing knowledge of the physical world when learning to use these tools. However, one disadvantage is that the user inherits all the limitations of the physical world.

Given the ability to interactively create 3D curves using the flexible tape, several techniques for creating curves and surfaces interactively from these curves will now be described.

FIGS. 11A, 11B and 11C depict the process of dropping curves into a scene. In this process, as shown in FIG. 11A, the user positions the flexible tape 122 at a position which places the tape curve 124 at a desired position in the scene and operates the input device, such as the trader button to bake the tape curve into a scene curve 126 on the display 127 as shown in FIG. 11B. The user then moves the flexible tape 122 into another position having a corresponding tape curve position 128 where another curve is desired in the scene. This second curve position and shape is baked creating scene curve 130. This process of baking curves at desired location continues until the user is satisfied.

"Loft" refers to the conventional construction of a surface that passes through a series of profile curves. Conventional interaction techniques require that at least two profile curves be predefined before a surface can be lofted over them. Additional curves can then be added to extend the lofted surface.

Figure 12A:
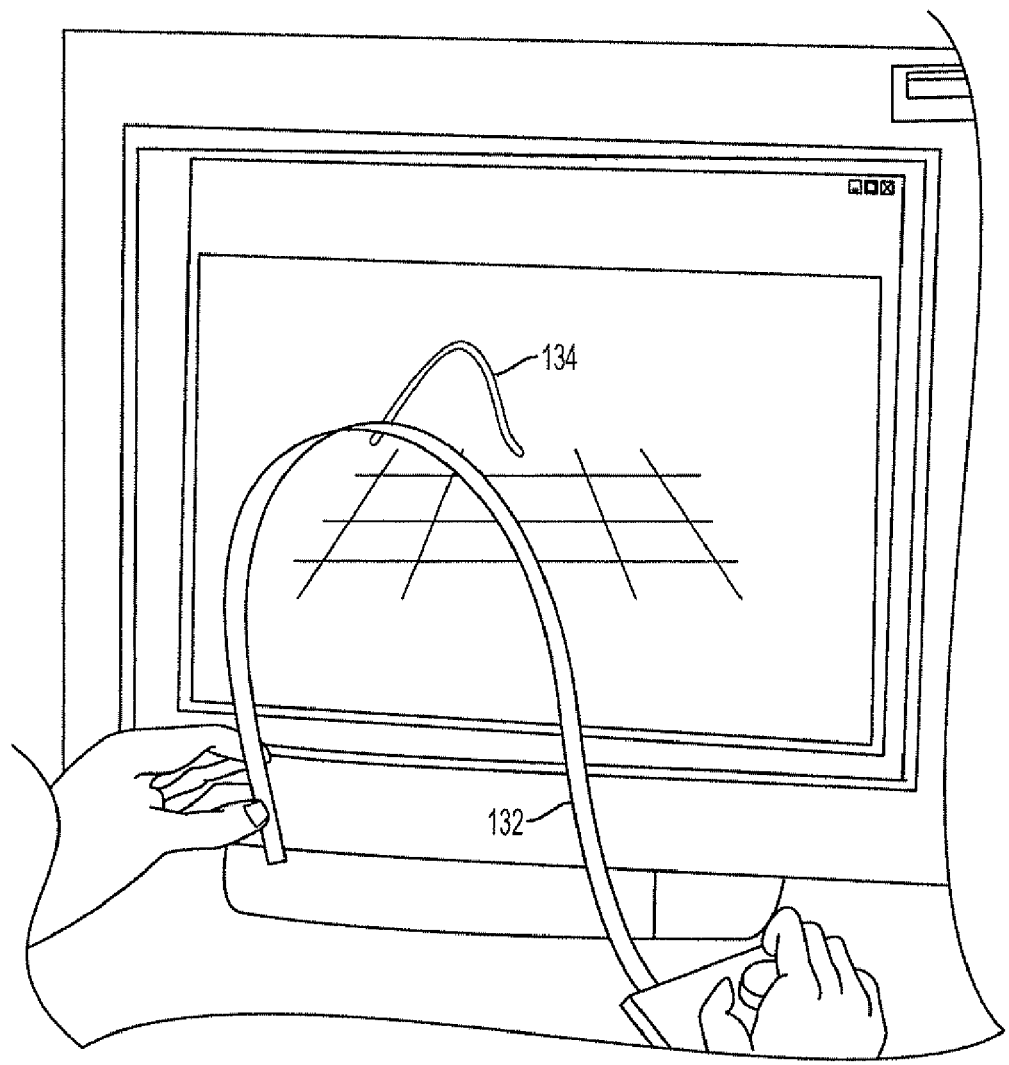
FIGS. 12A-12C show lofting a surface from an anchor curve to the tape curve.
Figure 12B:
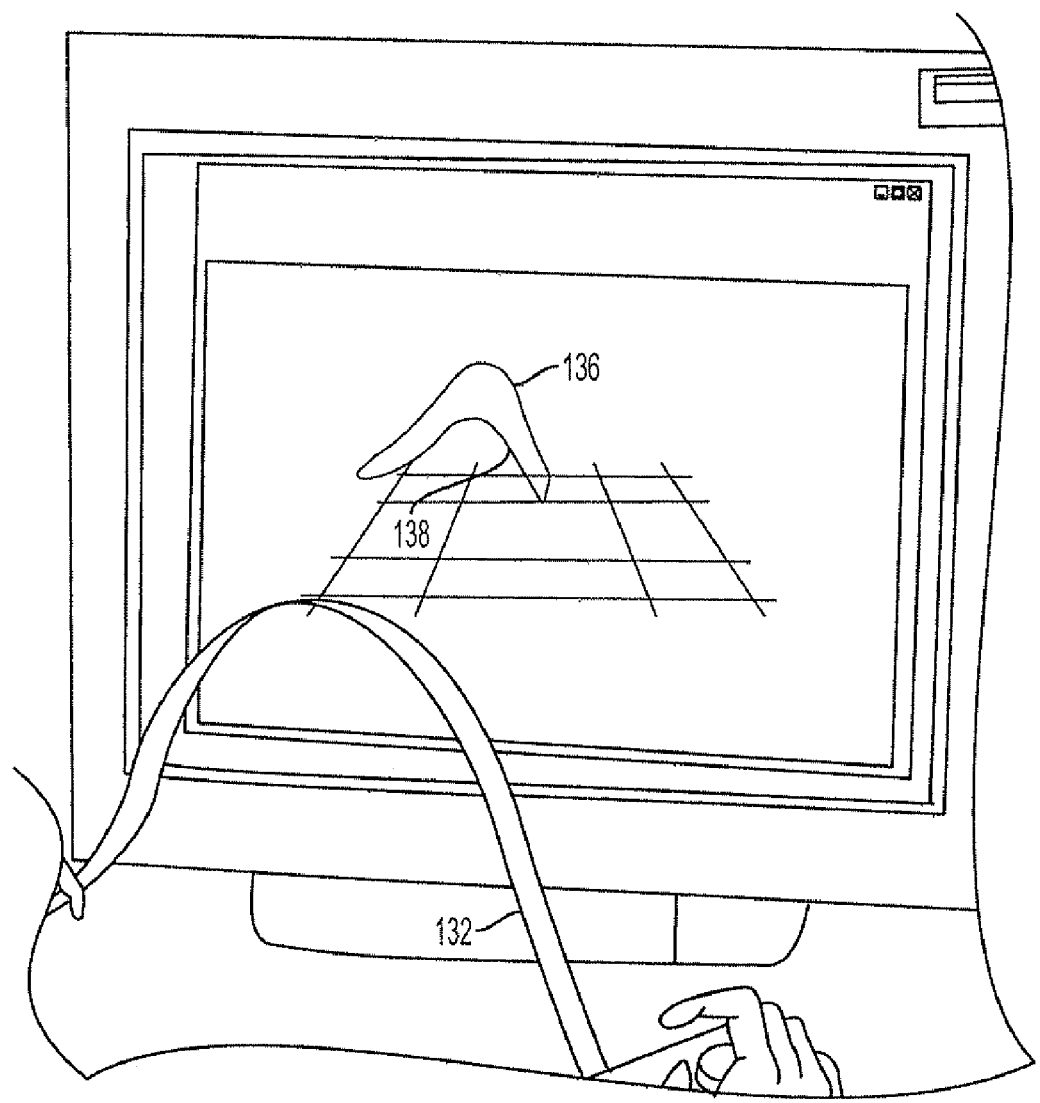
Figure 12C:
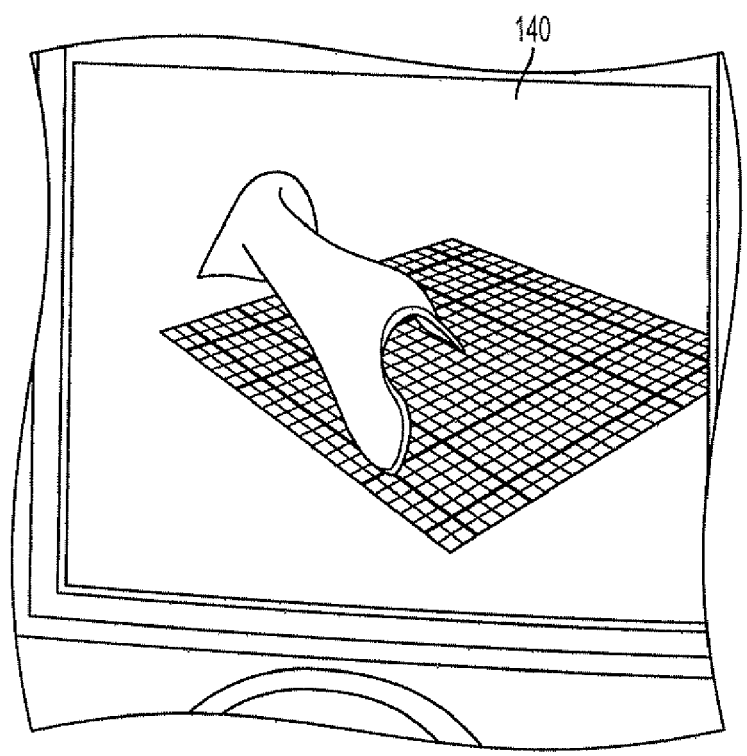

Using the flexible tape, the loft tool of the present invention creates surfaces as follows. First, the flexible tape 132 is used to bake an initial profile curve 134 as shown in FIG. 12A. Then, a button is pressed in the command mode to create a lofted surface 136 from the initial profile curve 134 to the tape curve 138 as shown in FIG. 12B. Since the tape curve is still "live", the user can dynamically change the shape of the lofted surface segment in real time (FIG. 11B). While the user is moving the flexible tape, the position, orientation and shape of the tape curve at each instant is known from the sampling of the flexible tape 12 and the locator 16. The position of the tape curve at the latest sample or current position is displayed on the display. The system then conventionally constructs a surface between the first baked curve and current live virtual tape curve. That is, as the user drags the tape curve around in the display, a dynamic lofted surface segment is created that allows the user to see the shape of the three-dimensional surface being produced. Pressing button 1 in command mode again bakes the tape curve at the most recent flexible curve position, resulting in baked curve 138. The system then conventionally creates a "baked" surface from curves 134 to 138. A new live surface is then lofted from curve 138 to the current position of tape curve. This process can be continued to successively extend the lofted surface. Once the final surface is obtained, a second button is pressed and the tape curve is detached from the final lofted surface 140 as shown in FIG. 12C.

This technique allows users to "drag out" a surface starting from the initial profile curve, baking sections of the surface as desired. The ability to manipulate the current surface segment in a live manner allows the user to preview and explore variations of the forthcoming surface before baking it. In contrast, the status quo interaction technique requires the user to lay down a series of curves and then loft a surface across those curves. No preview of the resulting surface is given, and any changes have to be made in a post-creation process.

The physical constraints discussed previously can also be used here to constrain the tape curve and thus create the smooth controlled surfaces that are typically used in non-organic technical modeling.

Figure 13A:
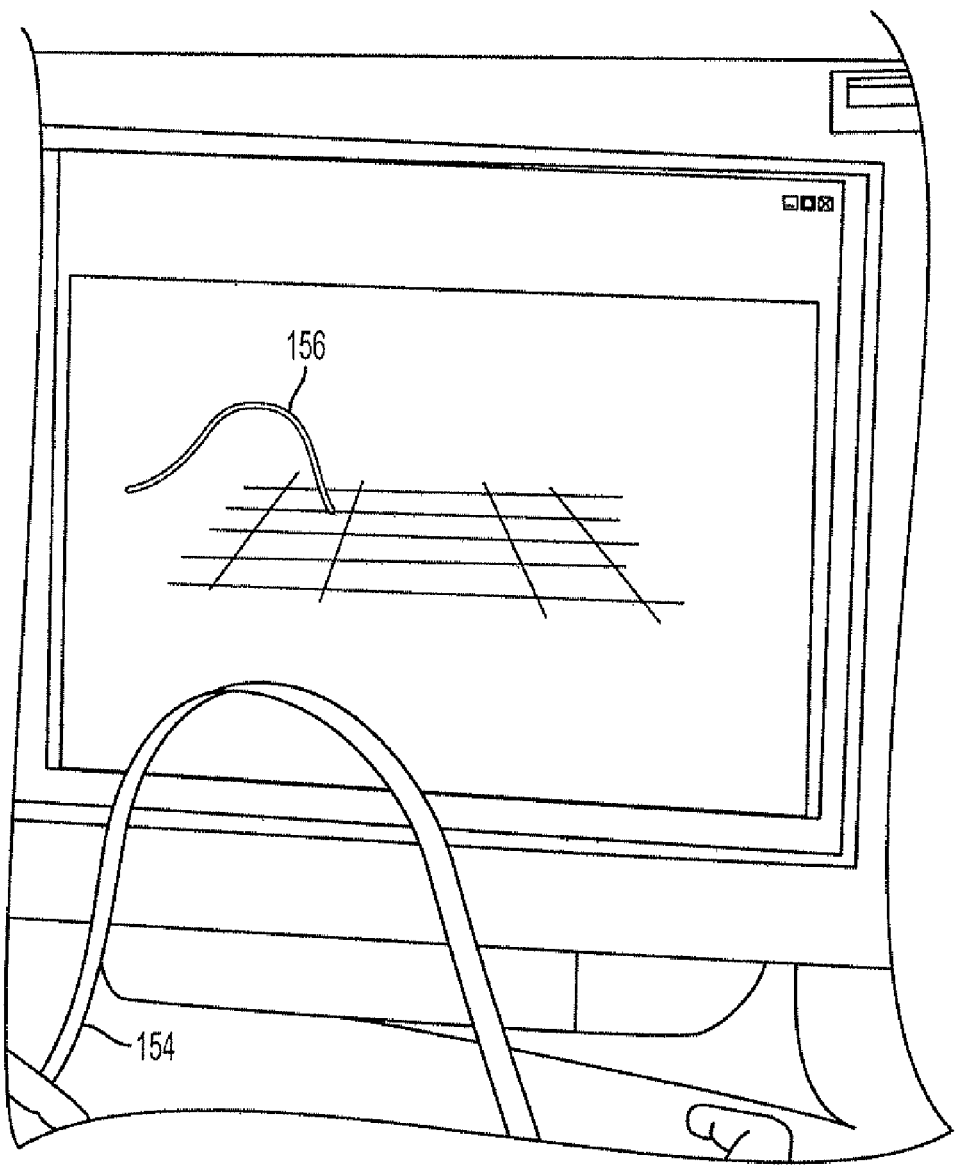
FIGS. 13A-13C show creating an object by rotating a profile curve created by the flexible tape.
Figure 13B:
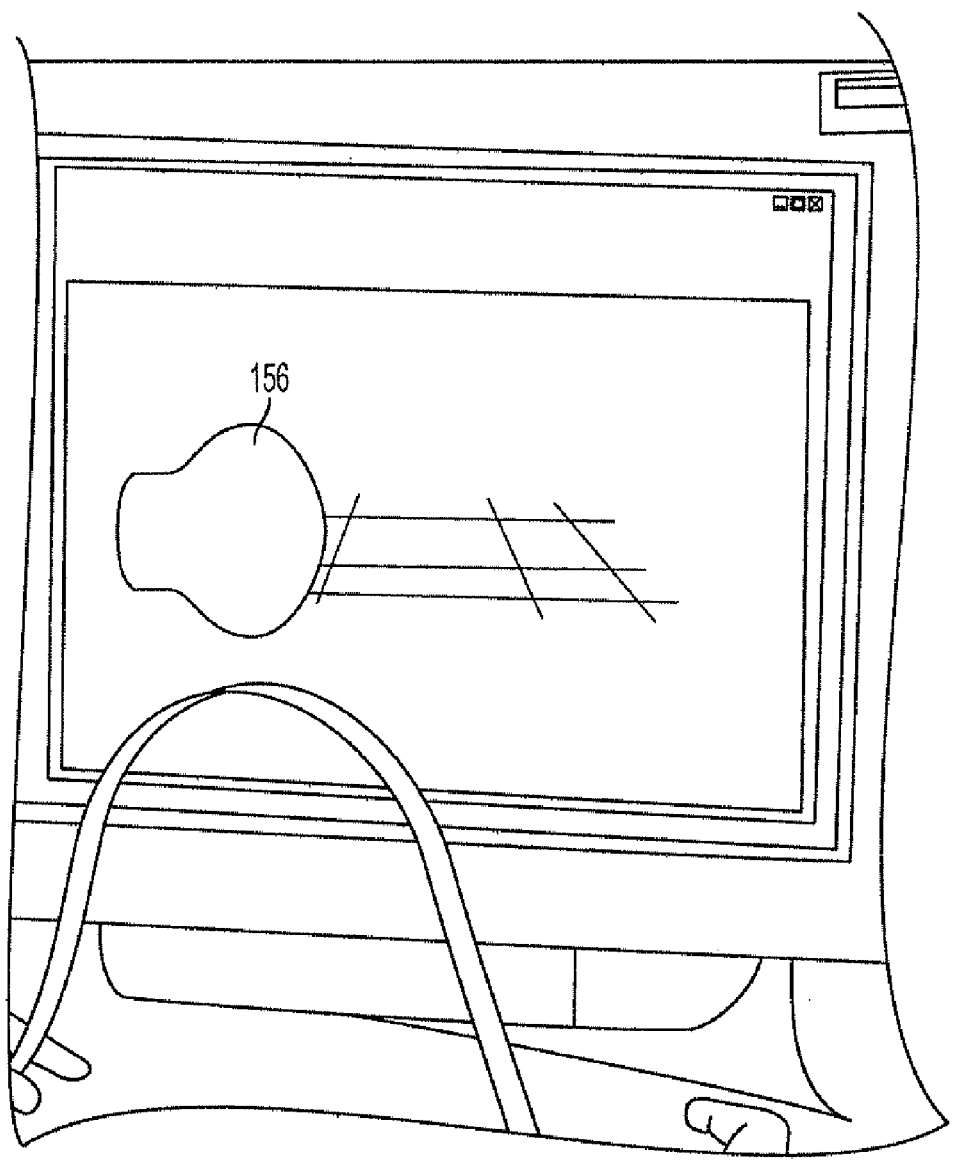
Figure 13C:
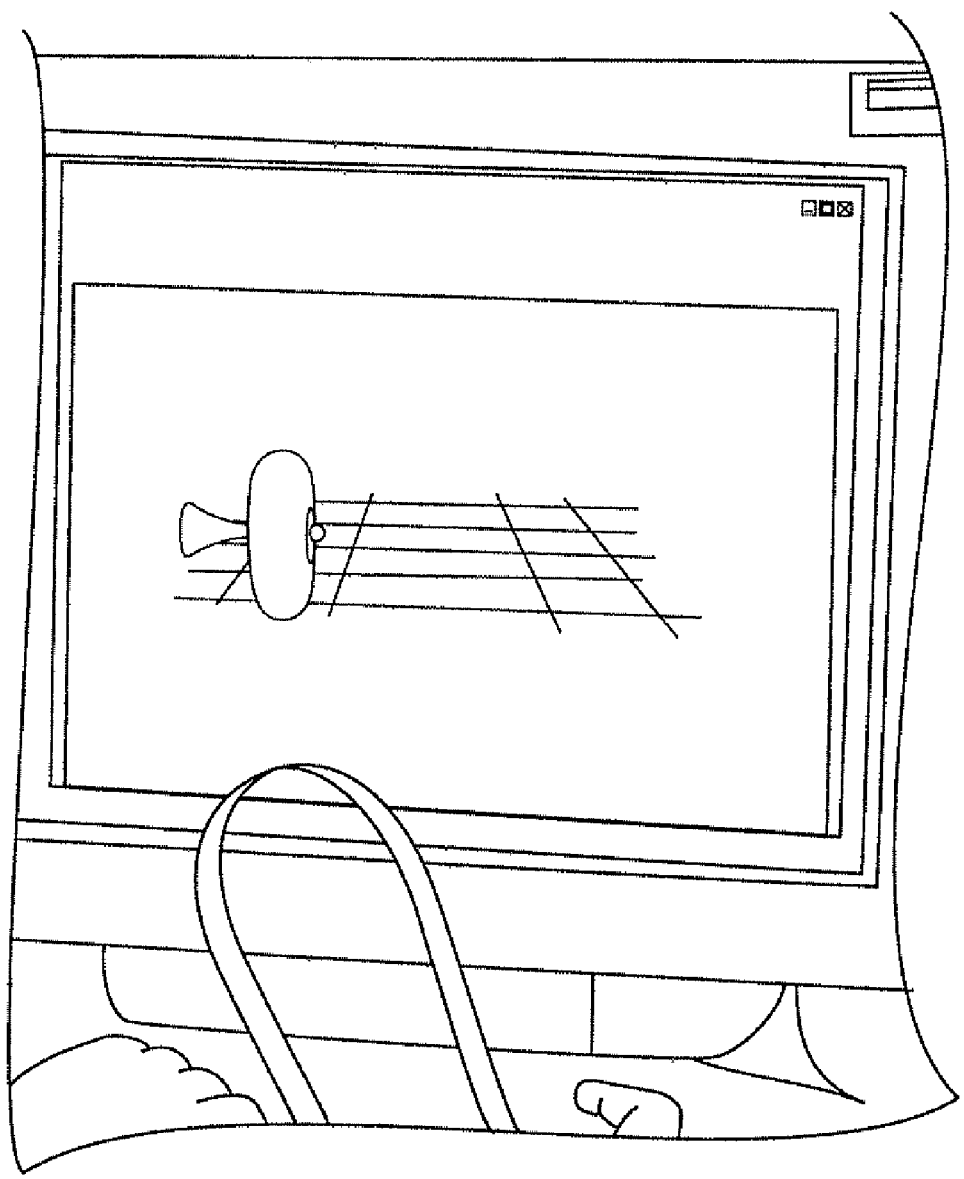

"Revolve" refers to the conventional construction of a surface by revolving a profile curve about a given axis. The present invention can be used to create a revolved surface. In the "revolve tool", the user first specifies a profile curve 152 using the flexible tape 154 as shown in FIG. 13A. This curve 152 can either be frozen or live. The user then presses one of three buttons in the command mode to conventional revolve the profile curve about the x, y or z axis respectively as shown in FIG. 13B. When the revolve button for an axis is activated, the system conventionally rotates the profile curve 152 about the designated axis (by, for example, treating the curve as if it existed in a cylindrical coordinate system with the selected axis as the center of the cylindrical coordinate system and changing the angle of the tape curve with respect to the angular reference). As the tape curve is moved the system conventionally creates a surface 156 (see FIG. 13B) in the same manner as discussed above with respect to the lofted surface. Since the profile curve 152 is still controlled by the flexible tape 154, the resulting surface can be manipulated in a very interactive manner to explore different shapes, positions, and orientations such as shown in FIGS. 13B and 13C depicting a dynamic change in the shape of the object during the revolve. A button can be pressed at any time to complete the revolve operation which bakes the revolved surface.

In status-quo revolve techniques, the resulting revolved surface can only be manipulated by moving the individual control vertices of the profile curve or by translating, orienting, or scaling the entire curve. While this is fine for small modifications, it does not provide the sense of engagement or expressiveness of the flexible tape technique.

Figure 14C:
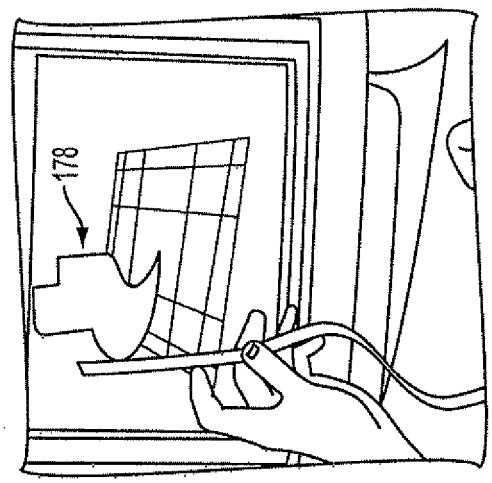
FIGS. 14A-14C illustrate using a profile curve to control a path of a shapable curve to form a surface.
Figure 14B:
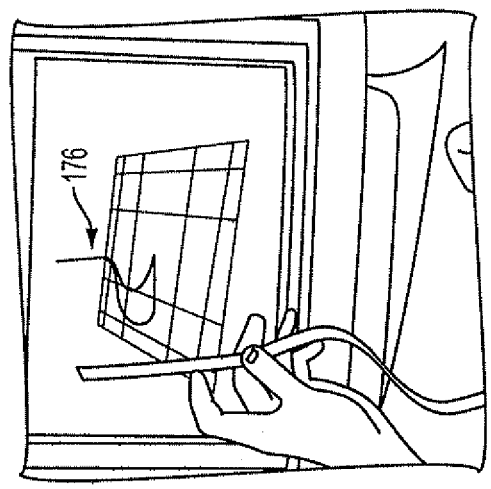
Figure 14A:
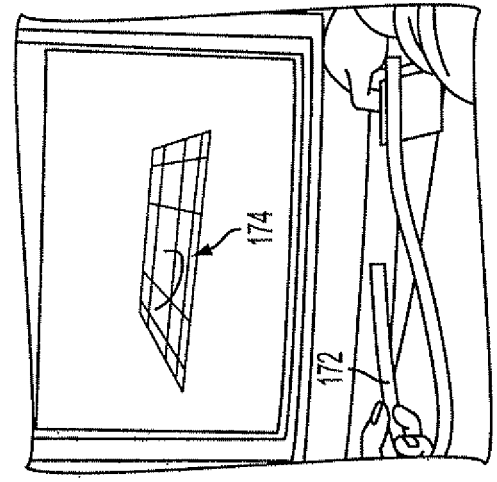

"Extrude" refers to conventionally constructing a surface by sweeping a cross sectional profile curve along a path. In the "extrude tool" of the present invention, the user places the tape curve in a desired position and with a desired shape using the flexible tape 172, and specifies and bakes a profile curve 174 as shown in FIG. 14A by pressing a button B in Command Mode. Then, the tape curve is moved (again by moving the flexible tape 172) and used to specify a path curve 176 as shown in FIG. 14B. This curve 176 can either be frozen or live. Pressing the button B again creates an extruded surface by conventionally sweeping the profile curve 172 along the path curve 176 as shown in FIG. 14C. Since the path curve 176 is still controlled by flexible tape 172, the extruded surface 178 can now be manipulated interactively. Another button can be pressed at any time to bake the extruded surface and detach the tape curve from it.

As with the revolve example, the flexible tape extrude technique allows for more expressive manipulations of the surface than the status-quo interaction technique. The technique described above allows interactive manipulation of the surface only by controlling the path curve, not the profile curve. It is possible to provide a similar technique to dynamically select which curve the flexible tape controls and thereby control the profile curve as it moves along the paths easing the drag operation previously discussed.

The previous tools permit the creation of surfaces. The description will now discuss techniques for deforming existing surfaces of arbitrary shape. The present invention can use the flexible tape to manipulate "wires" which is a geometric deformation technique based on space curves. The tape curve manipulated by the flexible tape is essentially used as the wire curve or reference curve in the scene being created. This application also highlights the use of the flexible tape's twist capability.

Figure 15A:
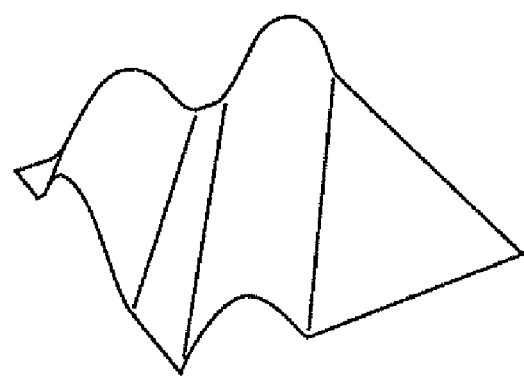
FIGS. 15A and 15B show wire and reference curves being controlled with a tape curve.

A wire is a curve whose manipulation deforms the surface of an associated object near the wire curve. The deformations to objects are based on the relative deviation between the wire curve and its corresponding reference curve as shown in FIG. 15A (see Methods and Apparatus for Geometric Model Deformation Using Wires by Singh having U.S. Ser. No. 09/109,903 incorporated by reference herein). The reference curve is a congruent copy of the wire curve made when objects are associated with it. An appealing attribute of wires is that not only do they utilize the bend of the curve, but they also embody the notion of twist around the wire curve and impart it to the surfaces they deform. A user is thus able to use the twist of the flexible tape to directly control the twist along a wire curve.

The effect of twisting the flexible tape is thus manifested as a surface deformation even though it is not visually represented on the wire curve.

The "wire tool" of the invention provides three styles of interaction to deform surfaces with wires. In all three styles, we attach a wire curve to a surface to be deformed by pressing a button in Command Mode. Pressing a second button in Command Mode detaches the wire from the surface. A third button is used to change between the three styles of interaction.

Figure 15B:
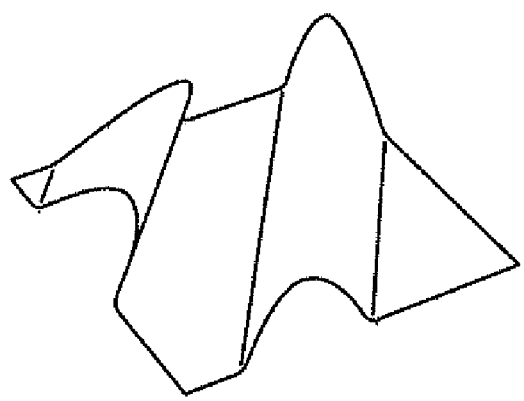
Figure 16A:
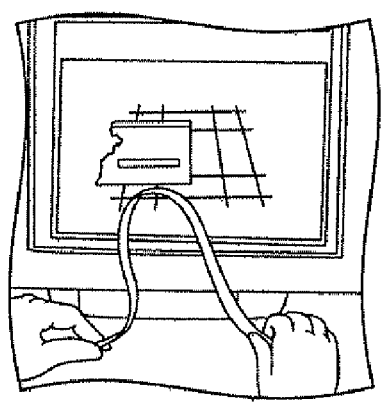
FIGS. 16A-16C depict using a tape curve to deform a surface.
Figure 16B:
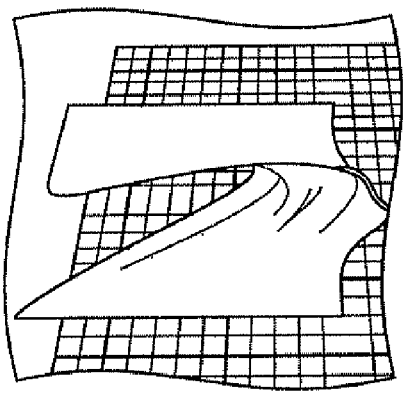

In the first style, the flexible tape controls the bend, position, and orientation of the wire curve (that is, the tape curve becomes the wire curve) while the reference curve remains static. This allows for creasing deformations to be created as illustrated in FIG. 15B (left-hand side) and FIGS. 16A and 16B.

The second style operates in the same manner as the first style except that the reference curve is translated along with the wire curve. This allows for "traveling" wrinkle deformations as illustrated in FIG. 15B (right-hand side). In this situation, the reference curve is conventionally attached to the wire curve using an offset of a predetermined amount. When the wire curve is moved, the reference curve moves with it.

Figure 16C:
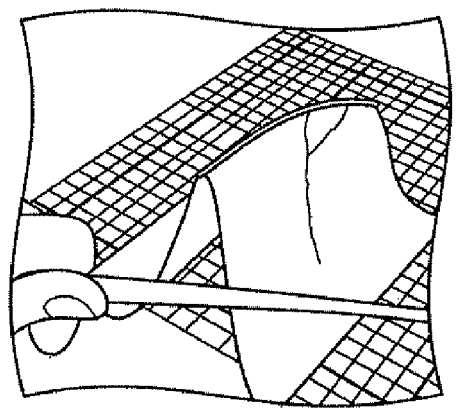

The third style uses the twist of the flexible tape in addition to bend, position, and orientation to control the wire curve. Adding twist further deforms the crease and wrinkle deformations in a manner similar to pinching as shown in FIG. 16C.

Wires are a deformation technique originally designed to create organic surfaces like cloth and skin. Using the flexible tape with wires allows for deformations of surfaces that would be very difficult to specify with traditional tools for manipulating wires. Like surface creation tools, the ability to quickly explore different deformation effects allows for more expressive manipulation than the control vertex positioning status-quo techniques.

Figure 17A:
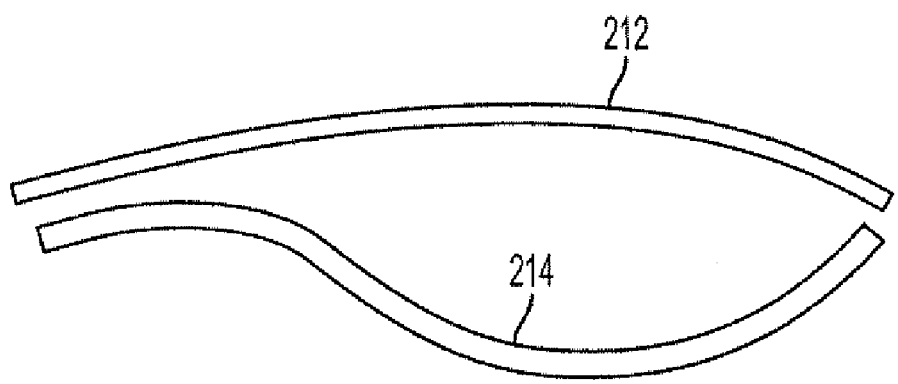
FIGS. 17A and 17B show the editing of a curve with the tape curve.
Figure 17B:
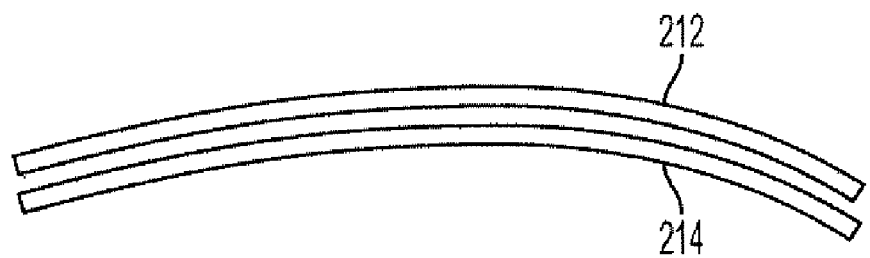

The flexible tape and the tape curve of the tape invention can also be used to make changes in existing curves and surfaces of a model. FIG. 17A depicts a tape curve 212 controlled by a flexible tape (not shown) and being positioned in a scene in close proximity to a model curve 214 whose shape is to be changed. By conventionally attaching the curve 212 to the curve 214 and activating a conventional "snap" command with one of the available activation input devices, such as a locator button, the shape of the model curve 214 can be caused to conventionally agree with the shape of the tape curve 212 using a conventional snapping process in which the closest points of the model curve 214 are set to an offset of control point values of the tape curve 212.

The present invention can also be used to control the shape of an object model from a viewpoint different from the viewpoint which was used to create the model. This is shown in FIGS. 18A and 18B. A tape curve 222 based on the shape of a flexible tape 224 can be used to loft a desired surface 226 as shown in FIG. 18A. The viewpoint of the model surface 226 can be rotated to allow the shape to be seen from another point of view as shown in FIG. 18B. When this occurs the orientation of the tape curve 222 remains aligned with the viewer and with the flexible tape 224 as shown in FIG. 18B. Any changes in the shape of the tape 224 are reflected in the curve 222 and in the lofted model 226.

Figure 19A:
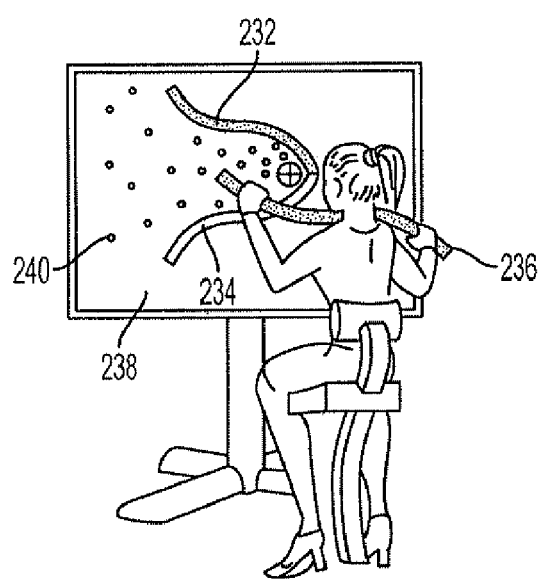
FIGS. 19A and 19B show using the flexible tape to control and animation sequence.
Figure 19B:
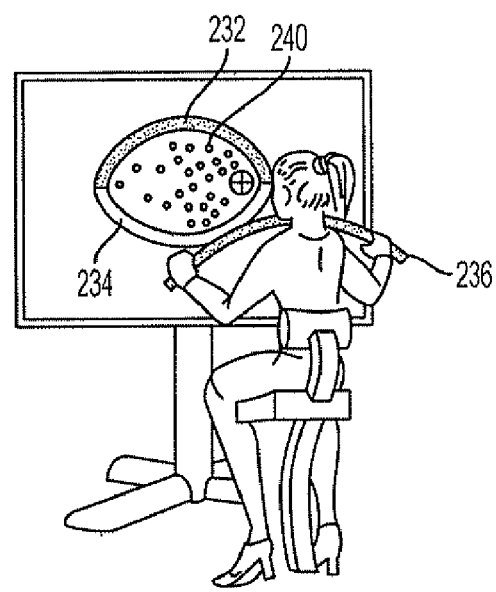

The flexible tape can also be used to dynamically control an animation process as shown in FIGS. 19A and 19B. For example, the user can create curves 232 and 234 with the tape 236 in the animation space 238 using the techniques previously discussed where the curves can be conventionally designated to act as barriers to particles 240 being emitted at another location in the animation space 238 as shown in FIG. 19A. As the particles 240 bounce off the barriers 234 and 234, the user can use the tape 236 to animate (change) the shape of the barriers 232 and 234 to capture the particles 240 as depicted in FIG. 19B. The tape in this embodiment can also be used to specify motion paths, adjust timing curves, motion capture, or for quickly editing and posing characters and deformable objects like cloth.

Figure 20:
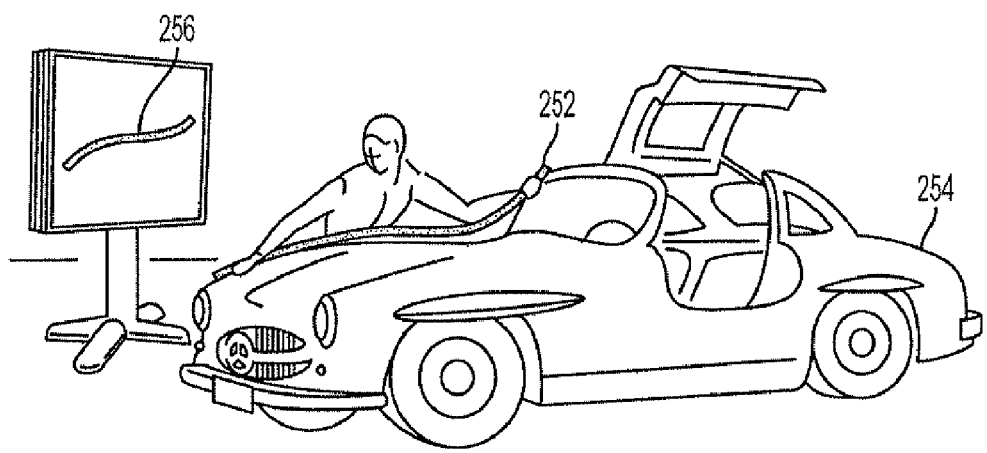
FIG. 20 shows using the flexible tape as an input scanning device.

The flexible tape 252 can also be used as an input device to capture the actual curves of an existing object 254 by positioning the tape 252 on the object 254 and baking the tape curve 256 produced by the shape of the tape 252 as shown in FIG. 20.

The flexible tape can be modified to allow subsection specification. For example, suppose a user is happy with the shape of one half of the tape curve but wishes to modify the other half. Sensors can be added along the length of the tape and used in pairs to specify which subsections are active, thus limiting changes to the corresponding parts of the tape curve. Sensing technologies that are suitable include binary micro switches embedded in the tape and pressure sensitive strips.

The mapping of the flexible tape held by the user to the tape curve created in the virtual scene space can be changed. An important issue is the control mapping between the flexible tape and the tape curve. In the prior discussions a one-to-one mapping was used where the unit length of the tape mapped to the unit length of the tape curve with a constant gain. This mapping can be changed. For example, the entire flexible tape could be mapped to a subsection of the tape curve (or a scene), allowing finer control over that portion of the tape curve. This can be accomplished by designating handles that specify the desired subsection where these control handles can be manipulated by the user using either the tape device or a mouse input device. Subsections of the tape can also be mapped to subsections of the tape curve in a non-one-to-one manner in a similar manner. Editing of existing curves in a scene can be achieved by selecting a subsection of a scene curve and conventionally mapping it to a subsection of the tape curve. This section of the virtual curve could then be edited by the tape.

In previous discussions the gain (how much a tape curve changes for any change in the flexible curve) has been 1. Increasing or decreasing control gain can also be accomplished by using a scalar to multiply the change in position of the tape as it is being mapped to the curve. For example, by increasing the control gain ratio, small tape bends could translate into larger bends in the tape curve. This could be used as a convenience mechanism to reduce physical movement. In contrast, the gain ratio could be decreased and this would result in more precision control over the bends of the tape curve. The gain control could also be non-uniform. Varying the gain ratio over the unit length of the tape is also a useful mechanism. Mappings could be conventionally created where the tape is much more sensitive (or insensitive) over certain sections of the shape. This could be used to create curves which when bent have a pre-bias towards a certain shape.

When working with the tape, a user may find it necessary to provide a way to switch between tools. There are many possible solutions to this problem. First, additional push buttons can be added to the tracker or more foot pedals provided. This solution is not very attractive as the tracker is already crowded with buttons. Introducing more foot pedals may be problematic as the user must search for the proper fool pedal, diverting attention from the 3D scene. Second, the system could use speech and voice recognition to specify commands. Third, and a preferred solution, is to provide a set of flexible tape gestures that would map to commands. This can be accomplished by using the end of the shape tape furthest from the tracker as a pointer and recording the gesture made by the user with the end of the tape. The recorded gesture is then conventionally compared to preexisting gesture templates in a character recognition operation to identify the command being gestured. Alternatively the gesture could be used to select from a conventional marking menu which is activated when the tape is switched to command mode. A series of pressure sensors would be added along the length of the tape and used as a button strip for command control buttons. One limitation of this idea is that these buttons cannot be used while simultaneously specifying a shape since pressing will deform the tape (for example, the "freeze" command would be a poor choice). The shape of the tape in the command mode could also be used to specify a particular command. For example, holding the tape in the shape of an "O" would specify an open operation.

Beyond command access, the tape device can work in conjunction with standard GUI elements by driving the cursor. That is, the end of the tape could be used to control the position of the cursor and the cursor used to initiate actions. This would allow the user to use standard GUI widgets like graphical buttons, sliders, and menus for operations such as tool switching without having to put down the tape. This is accomplished by tracking the location of the end of the tape relative to the screen and mapping this to a cursor location. The foot pedals are used for simulating mouse buttons. Alternatively, button presses could be simulated when the tape endpoint is moved in or out a fixed distance from the screen.

The above description has the flexible tape as the primary input device, always in the users hand, but alternative input configurations with different costs and benefits are possible. For example, an alternative operates the tape on a 2D surface where the contour of the tape is sensed as an input curve but the location and orientation of the curve is managed through more traditional and conventional interaction techniques (i.e., manipulators) with the mouse. The benefits of this configuration is that the tape does not need to be continuously held and a 6dof tracker is not required.

Two or more flexible tape devices can be used to form a shape sheet. This would allow a user to directly manipulate surfaces.

The many features and advantages of the invention are apparent from the detailed specification; and, thus, it is intended by the appended claims to cover all such features and advantages which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope of the invention.

What is claimed is:

1. A curve system, comprising:
   a flexible handheld tape device comprising a flexible tape having relative position sensing elements spaced along the tape, and producing relative tape positions relative to a reference position sensing element of the tape; and
   a curve system producing and controlling an entire smooth virtual tape curve using the relative positions.

2. A system as recited in claim 1, wherein tape shape is dynamically adjustable and curve shape corresponds to the tape shape.

3. A system as recited in claim 2, wherein the curve is a part of a surface and a shape of the surface corresponds to the curve shape.

4. A curve production system, comprising:
a flexible handheld tape device comprising a flexible tape having relative position sensing elements spaced along the tape, and producing relative tape positions relative to a reference position sensing element of the tape; and
a curve generation system producing and controlling an entire smooth tape curve using the relative positions for positions of the tape curve, and
wherein a scene includes an anchor curve and the tape curve drags out a surface shape from the anchor curve responsive to movement of the flexible tape.

5. A system as recited in claim 4, wherein the surface is created by interpolation between the anchor curve and the tape curve.

6. A curve production system, comprising:
a flexible handheld tape device comprising a flexible tape having relative position sensing elements spaced along the tape, and producing relative tape positions relative to a reference position sensing element of the tape; and
a curve generation system producing and controlling an entire a smooth virtual tape curve using the relative positions for positions of the virtual tape curve, and
wherein the virtual tape curve sets an object profile curve.

7. A system as recited in claim 6, wherein the tape curve provides a path to drag out an object shape along the profile curve.

8. A curve production system, comprising:
a flexible handheld tape device comprising a flexible tape having relative position sensing elements spaced along the tape, and producing relative tape positions relative to a reference position sensing element of the tape; and
a curve generation system producing and controlling an entire smooth virtual tape curve using the relative positions for positions of the virtual tape curve, and
wherein the tape curve sets a path curve.

9. A system as recited in claim 8, wherein the tape curve specifies a surface shape along the path curve.

10. A curve production system, comprising:
a flexible handheld tape device comprising a flexible tape having relative position sensing elements spaced along the tape, and producing relative tape positions relative to a reference position sensing element of the tape; and
a curve generation system producing and controlling an entire smooth virtual tape curve using the relative positions for positions of the virtual tape curve, and
wherein the flexible curve provides a profile and an object is created by revolving the profile curve in a scene.

11. A curve production system, comprising:
a flexible handheld tape device comprising a flexible tape having relative position sensing elements spaced along the tape, and producing relative tape positions relative to a reference position sensing element of the tape; and
a curve generation system producing and controlling an entire smooth virtual tape curve using the relative positions for positions of the virtual tape curve, and
wherein the tape curve is a spline curve and the relative tape positions are used as control points of the tape curve.

12. A curve production system, comprising:
a flexible handheld tape device comprising a flexible tape having relative position sensing elements spaced along the tape, and producing relative tape positions relative to a reference position sensing element of the tape;
a curve generation system producing and controlling an entire smooth tape curve using the relative positions for positions of the tape curve; and
a world position sensor attached to the flexible tape and providing a three dimensional world position of the tape and said curve generation system positions the tape curve in a virtual scene in correspondence to the world position.

13. A system as recited in claim 12, wherein said world position sensor senses three dimensional world orientation of said world sensor and said curve generation system positions the tape curve in a virtual scene in correspondence to the world orientation.

14. A curve production system, comprising:
a flexible handheld tape device comprising a flexible tape having relative position sensing elements spaced along the tape, and producing relative tape positions relative to a reference position sensing element of the tape;
a curve generation system producing and controlling an entire smooth tape curve using the relative positions for positions of the tape curve; and
a command input device producing an input command and said curve generation system controls the tape curve responsive to the input command.

15. A curve production system, comprising:
a flexible handheld tape device comprising a flexible tape having relative position sensing elements spaced along the tape, and producing relative tape positions relative to a reference position sensing element of the tape;
a curve generation system producing and controlling an entire smooth tape curve using the relative positions for positions of the tape curve; and
a command input device producing an input command and said curve generation system controls the tape curve responsive to the input command, and
wherein said command input device comprises one of a foot pedal, a foot mouse, buttons on a position locator and a portion of the flexible tape.

16. A system, comprising:
a flexible handheld tape device comprising a flexible tape having relative position sensing elements spaced along the tape and producing relative tape positions to a reference position sensing element of the tape
a curve generation system producing and controlling an entire smooth virtual tape curve using the relative positions for positions of the virtual tape curve; and
an animation system using the relative positions as a command.

17. A system as recited in claim 16, wherein a shape of the input device flexible tape indicates a command.

18. A system, comprising:
a flexible handheld tape device comprising a flexible tape having relative position sensing elements spaced along the tape and producing relative tape positions to a reference position sensing element of the tape; and
an animation system using the relative positions as a command, and
wherein an end portion of the flexible tape is used for input command gestures.

19. A system, comprising:
a flexible handheld tape device comprising a flexible tape having relative position sensing elements spaced along the tape and producing relative tape positions to a reference position sensing element of the tape; and
an animation system using the relative positions as a command, and
wherein an end portion of the flexible tape is used for a cursor control command.

20. A system, comprising:
a flexible handheld tape device comprising a flexible tape having relative position sensing elements spaced along the tape and producing relative tape positions to a reference position sensing element of the tape; and
an animation system using the relative positions as a command, and
wherein an end portion of the flexible tape is used for a selection control command.

21. A system, comprising:
a flexible handheld tape device comprising a flexible tape having relative position sensing elements spaced along the tape and producing relative tape positions to a reference position sensing element of the tape; and
an animation system using the relative positions as a command, and
wherein a system user drops curves in a scene responsive to tape curve position and the input command.

22. A system, comprising
a flexible handheld tape device comprising a flexible tape having relative position sensing elements spaced along the tape and producing relative tape positions relative to a reference position sensing element of the tape; and
editing system editing one of curves and surfaces responsive to the relative position.

23. A system as recited in claim 22, wherein a virtual scene includes a scene curve and said curve generation system edits the scene curve responsive to the tape curve.

24. A system, comprising
a flexible handheld tape device comprising a flexible tape having relative position sensing elements spaced along the tape and producing relative tape positions relative to a reference position sensing element of the tape; and
editing system editing one of curves and surfaces responsive to the relative position, and
wherein a scene includes a wire curve and the tape curve controls the wire curve.

25. A system as recited in claim 24, wherein the flexible tape comprises twist sensors and the wire curve is twisted in correspondence to the tape curve responsive to twist of the flexible tape.

26. A system, comprising
a flexible handheld tape device comprising a flexible tape having relative position sensing elements spaced along the tape and producing relative tape positions relative to a reference position sensing element of the tape; and
editing system editing one of curves and surfaces responsive to the relative position, and
wherein a scene includes a wire curve and a wire reference curve and the tape curve controls the wire curve and the wire reference curve.

27. A system, comprising
a flexible handheld tape device comprising a flexible tape having relative position sensing elements spaced along the tape and producing relative tape positions relative to a reference position sensing element of the tape; and
editing system editing one of curves and surfaces responsive to the relative position, and
wherein a scene include a scene curve and the scene curve is snapped to a shape of the tape curve.

28. A curve production system, comprising:
a flexible handheld tape device comprising a flexible tape having relative position sensing elements spaced along the tape, and producing relative tape positions relative to a reference position sensing element of the tape; and
a curve generation system producing and controlling an entire smooth tape curve using the relative positions for positions of the tape curve, and
wherein said curve generation system comprises a user controllable gain controlling relative positions of the tape curve responsive the relative positions of the flexible tape.

29. A curve production system, comprising:
a flexible handheld tape device comprising a flexible tape having relative position sensing elements spaced along the tape, and producing relative tape positions relative to a reference position sensing element of the tape; and
a curve generation system producing a smooth tape curve using the relative positions as positions of the tape curve, and
wherein said tape curve is displayed egocentrically to the user in a scene in which the tape curve is interacting within changes in viewpoint.

30. A curve production system, comprising:
a flexible handheld tape device comprising a flexible tape having relative position sensing elements spaced along the tape, and producing relative tape positions relative to a reference position sensing element of the tape; and
a curve generation system producing a smooth tape curve using the relative positions as positions of the tape curve, and
wherein the flexible tape comprises a physical constraint comprising one of a substitutable mechanical stiffness member, a physical position lock and a shape retaining member.

31. A curve production system, comprising:
a flexible handheld tape device comprising a flexible tape having relative position sensing elements spaced along the tape, and producing relative tape positions relative to a reference position sensing element of the tape; and
a curve generation system producing and controlling an entire smooth tape curve using the relative positions for positions of the tape curve, and
wherein the tape curve dynamically controls curves in a dynamic scene responsive to the flexible tape.

32. A curve production system, comprising:
a flexible handheld tape device comprising a flexible tape having relative position sensing elements spaced along the tape, and producing relative tape positions relative to a reference position sensing element of the tape; and
a curve generation system producing and controlling an entire smooth virtual tape curve using the relative positions for positions of the virtual tape curve, and
wherein the flexible tape is conformed to a shape of a physical object and the virtual tape curve comprises an input of the shape.

33. A curve production system, comprising:
a flexible handheld tape device comprising a flexible tape having relative position sensing elements spaced along the tape, and producing relative tape positions relative to a reference position sensing element of the tape; and
a curve generation system producing and controlling an entire smooth tape curve using the relative positions for positions of the tape curve, and
wherein said device includes subsection specification sensors and said tape curve shape is responsive to subsection shape.

34. A curve production system, comprising:
a flexible handheld tape device comprising a flexible tape having relative position sensing elements spaced along the tape, and producing relative tape positions relative to a reference position sensing element of the tape;

a curve generation system producing and controlling an entire smooth tape curve using the relative positions for positions of the tape curve;

a two-dimensional surface upon which said device rests and upon which surface a shape of said device is changed; and a world position input device specifying a world position of the tape curve.

35. A curve production system, comprising:

a flexible handheld tape device comprising a dynamically shape adjustable flexible tape having relative position sensing elements spaced along the tape and producing relative tape positions relative to a reference position sensing element of the tape;

a curve generation and editing system producing and controlling an entire smooth spline tape curve using the relative positions as positions of the tape curve corresponding to the dynamically adjusted shape and producing a shape of a surface when the tape curve drags out a surface shape from an anchor curve responsive to movement of the flexible tape; and a world position sensor attached to the flexible tape and providing a three dimensional world position and orientation of the tape and said curve generation system positioning the tape curve in a virtual scene in correspondence to the world position and orientation; and with said tape device acting as command input device producing an input command and said curve generation system controlling and editing the tape curve responsive to the input command and a shape of the tape curve.

36. A curve production system, comprising:

a flexible tape device producing shape, twist and six degrees of freedom position information;

curve production means for producing and controlling an entire smooth virtual tape curve by using the shape, twist and six degrees of freedom information for positions of the virtual tape curve; and display means for displaying the virtual tape curve having a shape, a twist and a position corresponding to the shape, twist and six degrees of freedom position information.

37. A curve production method, comprising:

adjusting a shape of a flexible tape; and producing and controlling an entire virtual curve using the flexible tape as control points of a non-uniform rational B-spline curve.

38. A computer readable storage controlling a computer and comprising a process of inputting a shape of a flexible tape and producing and controlling and entire a non-uniform rational B-spline curve responsive to the shape.

39. A graphical user interface comprising a virtual non-uniform rational B-spline tape curve entirely manipulable in a scene responsive to a physical flexible tape.

40. A curve production method, comprising:

adjusting a shape of a flexible tape with two hands; and producing and controlling an entire virtual curve using the flexible tape.

41. A curve production method, comprising:

adjusting a shape of a flexible tape having position sensors producing relative tape positions;

producing and controlling with the relative tape positions an entire virtual curve using the flexible tape; and displaying the virtual curve.

42. A curve production method, comprising:

allowing a user to adjust a shape of a flexible tape having position sensors producing relative tape positions;

producing all the points of a virtual curve using the relative tape positions; and displaying the virtual curve.

* * * * *

UNITED STATES PATENT AND TRADEMARK OFFICE
CERTIFICATE OF CORRECTION

PATENT NO. : 7,289,121 B1
APPLICATION NO. : 09/539872
DATED : October 30, 2007
INVENTOR(S) : Ravin Balakrishnan et al.

It is certified that error appears in the above-identified patent and that said Letters Patent is hereby corrected as shown below:

Title Page, Column 1 (Other Publications), Line 3, change "SYmposium" to --Symposium--.

Title Page, Column 2 (Other Publications), Lines 3-6, below "Ma, Lau, Feng, Wong; Surface Deformation Using the Sensor Glove; ACM 1997, pp. 189-196.*" delete "Balakrishnam et al. (1999) Exploring Interactive Curve and Surface Manipulation Using a Bend and Twist Sensitive Input Strip. Proceedings of 1999 ACM Symposium on Interactive 3D Graphics pp. 111-118.". (Second Occurrence)

Title Page, Column 2 (Other Publications), Line 11, change "o nInteractive" to --on Interactive--.

Title Page, Column 2 (Other Publications), Line 13, change "Confrence" to --Conference--.

Column 3, Line 26-27, delete "The processes can also be distributed via, for example downloading, over a network such as the Internet" and insert --The processes can also be distributed via, for example downloading, over a network such as the Internet.--, on line 25, after "distributed." as continuation of the paragraph.

Column 3, Line 43, change "an" to --a--.

Signed and Sealed this

Twenty Second Day of April, 2008

JON W. DUDAS
*Director of the United States Patent and Trademark Office*